United States Patent
Lefevre et al.

(10) Patent No.: US 10,757,915 B2
(45) Date of Patent: Sep. 1, 2020

(54) LONG-RANGE ELECTRONIC IDENTIFICATION SYSTEM

(71) Applicants: Donald Keith Lefevre, Rapid City, SD (US); Wendell Maurice Peden, Rapid City, SD (US)

(72) Inventors: Donald Keith Lefevre, Rapid City, SD (US); Wendell Maurice Peden, Rapid City, SD (US)

( * ) Notice: Subject to any disclaimer, the term of this patent is extended or adjusted under 35 U.S.C. 154(b) by 495 days.

(21) Appl. No.: 15/457,871

(22) Filed: Mar. 13, 2017

(65) Prior Publication Data

US 2017/0181401 A1    Jun. 29, 2017

Related U.S. Application Data

(63) Continuation-in-part of application No. 14/334,641, filed on Jul. 17, 2014, now abandoned.

(Continued)

(51) Int. Cl.
| | |
|---|---|
| *G06K 19/07* | (2006.01) |
| *A01K 11/00* | (2006.01) |
| *G01S 19/14* | (2010.01) |
| *G01K 13/00* | (2006.01) |
| *G01P 1/00* | (2006.01) |
| *A01K 15/02* | (2006.01) |
| *A01K 29/00* | (2006.01) |
| *G06K 19/073* | (2006.01) |

(Continued)

(52) U.S. Cl.
CPC .......... *A01K 11/008* (2013.01); *A01K 11/004* (2013.01); *A01K 15/021* (2013.01); *A01K 29/005* (2013.01); *G01K 13/002* (2013.01); *G01P 1/06* (2013.01); *G01S 19/14* (2013.01); *G06K 7/10079* (2013.01); *G06K 19/0723* (2013.01); *G06K 19/07345* (2013.01); *F21V 23/0407* (2013.01); *F21Y 2115/10* (2016.08)

(58) Field of Classification Search
CPC ... G01S 17/026; G01S 17/74; G06K 7/10009; G06K 7/10554; G06K 7/10079; A01K 11/008; A01K 11/004; A01K 15/021; A01K 29/005
See application file for complete search history.

(56) References Cited

U.S. PATENT DOCUMENTS

| | | | | |
|---|---|---|---|---|
| 4,745,882 A | * | 5/1988 | Yarnall, Sr. | A01K 3/00 119/721 |
| 5,825,045 A | * | 10/1998 | Koenck | G06K 7/1097 250/566 |

(Continued)

*Primary Examiner* — Nabil H Syed
(74) *Attorney, Agent, or Firm* — Donn K. Harms

(57) ABSTRACT

An identification system is provided employing tags which may be targeted by a coherent energy beam such as a laser emanating from a query device controlled by a user. The tags may be activated with great precision even when tightly grouped and at great distances from the user through the employment of the communicated beam to activate the tags to report an identifier and or data stored thereon. The tags may be enable to rebroadcast a signal intended for another tag or form another tag in response to a receiver. The emanating laser is also adjustable for cross sectional contact area to increase accuracy. Security may be provided through the requirement of a proper query code being communicated to the tag prior to generation of a wireless data or identifier response.

8 Claims, 5 Drawing Sheets

Related U.S. Application Data

(60) Provisional application No. 61/958,074, filed on Jul. 17, 2013, provisional application No. 62/388,340, filed on Jan. 20, 2016.

(51) Int. Cl.
*G06K 7/10* (2006.01)
*F21V 23/04* (2006.01)
*F21Y 115/10* (2016.01)

(56) References Cited

U.S. PATENT DOCUMENTS

| | | | | |
|---|---|---|---|---|
| 6,104,295 A | * | 8/2000 | Gaisser | G06K 19/07749 |
| | | | | 340/572.8 |
| 2008/0186136 A1 | * | 8/2008 | Raphaeli | G01S 5/0215 |
| | | | | 340/10.1 |
| 2011/0091216 A1 | * | 4/2011 | Addy | G06K 7/0004 |
| | | | | 398/115 |
| 2011/0147459 A1 | * | 6/2011 | Goren | G06K 7/10544 |
| | | | | 235/462.21 |
| 2012/0182145 A1 | * | 7/2012 | Jameson | A01K 11/008 |
| | | | | 340/539.13 |

* cited by examiner

LONG-RANGE ELECTRONIC IDENTIFICATION SYSTEM

This Application claims priority to U.S. Provisional Patent Application Ser. No. 62/388,340, filed on Jan. 20, 2016, and is a Continuation in Part Application to U.S. patent application Ser. No. 14/334,641 filed on Jul. 17, 2014, which claims priority to U.S. Provisional Patent Application Ser. No. 61/958,074, filed on Jul. 17, 2013, all of which are collectively incorporated herein in their respective entirety by this reference thereto.

BACKGROUND OF THE INVENTION

1. Field of the Invention

The disclosed device and method relate to animal and, alternatively, object identification. More particularly, the system herein relates to a device and method enabling long range identification of individual tagged animals and objects, amongst a closely grouped plurality thereof, through the employment of a user-directed electromagnetic beam, which may be coherent light, which upon communication with a tag operatively positioned on an animal or object causes communication of an identifying response related specifically to the animal or object which is the recipient of the directed light communication.

2. Prior Art

In the industrialized nations as well as third world areas of the world, millions of animals are herded and kept in close groups to supply milk, fabric, meat, and other products. For instance, in the production of beef, animals are maintained and fed by the thousands in confined feeding operations known as "feed lots" on large tracts of land. Such operations can have a population in the thousands of animals, and include animals which are owned by a plurality of different owners.

Such a commercial enterprise conventionally houses animals from differing owners and thus it is paid for differing animal stock, from the large maintained herd of animals, owned by different parties. This creates a need for identification of each of the animals in a highly reliable manner. The same is true, for instance, for vehicles being run through an automotive auction or otherwise closely grouped in a parking lot, or for large areas where machinery may be adjacently stored, such as venues where hundreds of metal components are cured and weathered before use in an industrial plant.

In the case of animals, past identification has included plastic (visual) ear-tags and, more recently, electronically readable tags employing RFID radio frequency technologies. In the case of other objects, and even humans, for instance at ball game or concert, or skiing on a crowded mountain, RFID technologies have also provided a means for individual identification of each person, from the masses of people or objects in the large group, when the persons wearing the RFID impregnated tag reach a reading gate.

However, visual tags are not easily discerned when viewed from a distance, even with the aid of binoculars or the like, especially at odd angles. RFID type tags and similar RF identifiers conventionally require the object, person, or animal bearing the RFID identifier to move to a position proximate to a gate or other device which is capable of eliciting the electronic signal from the RFID. While highly accurate as to the object, animal, or person to which they relate, RFID-enabled and bar code type tagging systems are generally not readable from a distance of many feet or yards in passive mode. In modes of RFID which employ batteries which may transmit irrespective of an energized gate, such have not faired well due to short battery life and the rigors of operation on an animal in a harsh outdoor environment which can be wet, frozen, and continually affected by vibration from animal movement. Other modes of RFID and bar coded and similar tags also provide problems with visual identification of the individual item or person or animal when a large close group becomes proximate to a reading gate. While the gate may determine who or what is proximate, a viewing user cannot determine which item, person, or object relates to the information returned nor can they choose individual animals visually to identify.

As such, there is an unmet need for an identification system which provides highly accurate individualized identification, of distant, closely-spaced objects persons, or animals. Such a system should enable the user to visually identify an individual animal, person, or object from a distance, and then use the system to provide the user detained information on the visually sighted animal, person, or object. Such a system should also overcome the other shortcomings of existing electronic identification systems, such as bar codes, ear tags, and RFID components, which, even at short distances, frequently lack the ability to discern information about targeted individual animals, objects, or people who are closely spaced, and/or positioned at longer distances such as a distance which exceeds the beam width of the reading device.

The forgoing examples of related art and limitations related therewith are intended to be illustrative and not exclusive, and they do not imply any limitations on the identification system and method described and claimed herein. Various additional limitations of the related art will become apparent to those skilled in the art upon a reading and understanding of the specification below and the accompanying drawings.

SUMMARY OF THE INVENTION

The present invention provides users a means for identifying single objects, animals, or persons at larger distances, and immediately discerning communicated information concerning the user-targeted object or animal Unlike existing systems, the device and method herein allows for the identification of these single objects or animals or persons when they are in a closely-spaced group, and/or in a position a large distance from the identifier. The system herein achieves this utility through the use of a directed electromagnetic beam which can be in the RF spectrum but preferably is employed using narrow coherent light beam or laser communication which is configured to allow a user to choose an individual, object, or person by aiming a query device emitting a coherent energy beam at the chosen frequency at the user-determined target. Concurrently, the user may thereby query a return of information from an individual electronic identification "tag" which is reactive to the received beam communication and which is operatively engaged with the object, person, or animal. The projected beam from the query device preferably has a landing diameter at the target sized to render it easily aimed at the target animal or object to cause the tag to react and return information so it need not be pencil-thin upon contact with the target and a diameter of a few inches may be preferable to render the device and method easily operative. The important aspect is that the communicated beam of energy be a coherent targetable beam which will cause the resulting response from targeted animal or object, and the tag engaged therewith.

The disclosed tag device, and method herein, is adapted for engagement upon an animal, person, or object, and, so positioned, the device will detect a communicated query from a directed emitted coherent energy or light signal communicated from the query device. While the specification herein describes the communication of a coherent beam as light based, which is preferable in the visual spectrum to allow user aiming, the use of a beam of RF energy or light beyond human visual perception can also be employed and is anticipated within the scope of this invention herein and is to be included where the term light or laser is employed.

Upon detection of a communicated coherent beam of light or other coherent beam of directed energy employed in the system, a tag is configured to then respond with an identifier, such as identification code, and/or with an identification code in combination with data held in onboard electronic memory. Alternatively, the tag of the system is configured to respond with data only, which may be employed using communication with an available relational database, to identify the animal or object, or used otherwise to discern information concerning the object, animal, or person to which the generated response relates.

A benefit of the employment of a laser or directed narrow beam of light or energy having a focused cross section adapted to communicate a query to the tags engaged to the object, animal, or person is the ability for the user to choose a target and then aim the query device and send a signal using a coherent beam of light, such as a laser, which communicates from the sending query device to the tag at a very narrow beamwidth upon communication therewith. The directed light may be emitted using an LED enabled laser or other laser device in any visual or invisible light spectrum available or it may be through the use of directable coherent energy, such as a microwave, with suitable means to aim and direct it to a target. The use of such a user-aimed extremely narrow coherent beam signal to choose the animal, person, or object desired, and elicit a response, is a significant advance over a conventional radio-frequency sending devices which are not selective as to discerned targets amongst a crowd.

Additionally, because the energy or light frequency employed by the sending device of the query component is preferably made visible or in the visual spectrum, contact with a target of a coherent beam or laser beam can be seen by the user employing it. This allows for very selective user targeting of individuals from closely grouped objects or animals from which to seek information. Of course, a sight may be provided where the coherent beam of electromagnetic energy or light is not visible to the user and which is sighted in on the landing of the distal end of the projected coherent beam so visually sighting or targeting herein can mean either the employment of a means for sighting or determining the landing of the coherent beam, or actually viewing it visually.

In all modes, communicating the coherent beam is accomplished by a simple pointing toward the object, person, or animal of interest of the narrow or coherent beam emission to a communication with a tag surface to elicit a response. As noted, if the coherent beam or the laser is outside the visible spectrum, such as at infrared wavelengths, a means for targeting by a user of an animal or object and the tag thereon, such as a simple optical scope with cross hairs, can provide the user with a targeting means for where the coherent beam or laser is communicating at its distal end, or the user may employ glasses or goggles having lenses or filters enabling them to view the projected beam during use.

In operation, the identifying response generated by the engaged ID tag receiving the coherent beam or light transmission from a user can be transmitted using a radio-frequency ID signal, it can be an on-off retro-reflected signal emitted from the tag in response to the communication of the laser or directed light beam thereto, or it can be by a light-based signal emanating from an onboard LED or other means to project a light signal response. The responding communication from the engaged ID tag, as noted, can include a visually discernable or electronically transmitted identifier and/or data. It can also include the activation of a visually perceptible identifier upon or in engagement with the ID tag such that a third party other than the aiming user can also discern information concerning the animal, person, or object wearing the ID tag.

As noted, in all preferred modes of the device and method, the employed coherent energy beam, laser. or light beam query signal from a targeted query device is communicated with a very narrow beamwidth. Thus, the visual landing point or a targeting device may be used to point at or select a single tag at very long distances even when that tag is located adjacent or in the midst of many other animals or objects bearing closely spaced tags. By aiming the means for targeting or the actual emitted light beam, and using his unaided eyes or a telescopic site, the user can thus pick a single tag of a single animal or object out of hundreds in a group to communicate the emitted beam communication thereto and thereby elicit a response to such a query from very a long distance. If aided by binoculars or a telescope, or telescopic sight, that distance can be in the hundreds or even thousands of yards since coherent energy beams or laser beams will traverse such distances with ease without significant divergence of the original diameter of the communicated beamwidth.

The beam divergence of an electromagnetic beam is an angular measure of the increase in beam diameter or radius with distance from the optical aperture or antenna aperture from which the electromagnetic beam emerges. The term is relevant only in the "far field," away from any focus of the beam. Practically speaking, however, the far field can commence physically close to the radiating aperture, depending on aperture diameter and the operating wavelength of the projecting energy or light beam.

Beam divergence is often used to characterize electromagnetic beams in the optical regime, for cases in which the aperture from which the beam emerges is very large with respect to the wavelength. That said, it is also used in the Radio Frequency (RF) regime for cases in which the antenna is operating in the so-called optical region and is likewise very large relative to a wavelength.

However, beam divergence conventionally and herein also refers to a beam of energy or light of a circular cross section upon communication with a surface or target, but not necessarily so. A beam may, for example, have an elliptical cross section, in which case, the orientation of the beam divergence must be specified, for example, with respect to the major or minor axis of the elliptical cross section. It is well known that the divergence of a coherent beam of directed energy or coherent light beam can be calculated and can be easily fixed, or adjusted, using lenses and/or changes in frequency, or other means for focusing at the emanating point to achieve the desired cross sectional area of communication with a target. Thus, the coherent beam herein, whether energy, visible, or invisible light, should have a cross sectional area on communication with a target, such as a tag, that renders it easily aimed and communicated to the tag, and the beam generating component may employ optical or RF lenses or other means for focusing the emanated coherent beam to a cross section on communication of the beam with a tag which is sufficiently wide to easily maintain momentary communication and to elicit a response. However, the cross section communicated should not be too wide so as to impact more than a single tag in close group thereof. For instance, between ¼ inch and 24 inches in cross section would work well to provide such targeted communication, although such may vary depending on the application, closeness of the tags, and distance of the target. Thus, the query device having the means for communicating a coherent beam of light or energy may also have a lens or aperture, frequency variance, or other means for focusing the projected beam to achieve the cross section at the point of communication of the coherent beam with the targeted tag and such would be preferable.

When the laser or coherent beam query signal images on or communicates with a light sensor or receiver, operatively engaged with a tag on the target, such will generate a current which may be electronically detected by appropriate circuitry on the tag. Using a microprocessor or other component which may be powered by a battery, or by the current from the received light beam or coherent energy beam, and using software adapted to the task of discerning a beam communication, the successful communication will elicit a return signal in the form of an electronic or visually transmitted identifier such as an ID code and/or a communication in return back to a receiver proximate to the user, a third party, or component in the form of data stored in onboard electronic memory.

In one preferred mode of the device and method, such data and/or identifier can be communicated back to the sending device, and/or another device adapted for reception of such tag communications, through modulating a retro reflective surface operatively positioned on the tag between "on" and "off" positions (reflecting and not reflecting), or by communication of an RF signal of the data or identifier, or both. This digital or on/off communication may be triggered by the communication of the laser or narrow light beam with the tag and thereby eliciting the response by a transmitter operatively engaged to communicate upon discerning a successful receipt of a light signal query from a user.

If used, a retro reflective response signal employs a reflector, configured to reflect light energy from the sending device, back in the direction of original communication. Such retro reflective materials are employed on highway signs so that the light from headlights is reflected back to the vehicle from which the original light was emitted thereby providing a means for communicating reflected light, and thus a message from the sign, in a manner brighter than if the sign were simply illuminated.

In one preferred mode of the device and method herein, an electronically-controlled optical shutter, such as a liquid-crystal display, or LCD which varies in transparency using a controller, or even electrically powered mechanically operated shutter, is positioned in front of a retro reflector or retro reflective surface. Thus, the shutter is positioned in-between the communication of the coherent beam or laser being transmitted to the tag and its reflective surface.

In operation, when the communicated coherent beam or laser query signal communicates to the retro reflector, while the shutter is open or "on," the transmitted light reflects back substantially toward the original light emitting query device being employed. A reader is engaged thereon or located proximate to the light-emitting device and adapted to read or communicate electronically, such a response communication from an energized tag.

When the shutter is closed or "off," limited or no light from the communicated laser beam is reflected back to the reading component. Employing an onboard electronic circuit and microprocessor running software, if necessary, a pattern of durations of reflected and non-reflected light can be generated to provide a code as a means to communicate the tag identifier or ID Code and/or an ID code plus data stored in onboard electronic memory on the device. As noted, the shutter can be a liquid crystal display which varies in transparency to modulate the reflected laser beam to encode the indenter or data or it could be mechanical.

In a mode employing active light-based communication, since conventional LCD displays are very power efficient, a retro reflective tag with an LCD and liquid crystal shutter can be employed in an energized state at all times, such that the shutter causes a continually blinking of the light emitted from the LCD and communication of data from the stored information resident in tag memory. Alternatively, LED's can be employed without the LCD and shutter and communicate in multiple directions upon communication of a light beam by a user.

In all modes of the device and method herein, such an LCD-enabled tag can be powered by solar cells, slow discharge capacitors, or onboard battery, or by a combination thereof. Employing such a tag having LCD's, which are only blinking to broadcast a visually discernable ID code and/or data, will use such a small current they can run for years off of a very small battery, such as wrist watch battery.

As mentioned previously, the advantage and object of the system and device herein is the ability for a user to employ a means for targeting and select a single animal, object, or person, bearing a single tag, at a long distance, from a group of closely spaced animals, objects, or persons wearing tags, and to subsequently receive an identifier such as an ID code and/or data from that one user-selected tag. Since the coherent energy or laser query signal allows the user to communicate a query to the tag of individual animals, objects or persons with great accuracy, the response signal does not have to be by retro-reflection of the laser beam itself. Instead, the query laser signal communicated to the tag can provide a discernible query code to electronic sensors and/or software running on a microprocessor of the tag, to trigger the tag to transmit an RF or light signal response which carries the identifier, or, it can also trigger a non-retro-reflected optically-communicated signal of the identifier and/or data relating with the tag which may be cross referenced through communication with an available database to discern the identity and other data concerning the animal, person, or object wearing it.

With respect to the above description, before explaining at least one preferred embodiment of the herein disclosed identification system in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, identification methods, and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising." Thus, use of the term "comprising" indicates that the listed elements are required or mandatory, but that other elements are optional and may or may not be present. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

OBJECTS OF THE INVENTION

It is an object of the invention to provide a significantly improved means for discerning information concerning animals, objects, or persons, located at a distance and/or in a group, using a tag system activated by light transmission to communicate data.

It is an additional object of the invention to provide such a system which allows a user to target an individual animal, object, or person through communication of a laser or narrow light beam which a user targets and communicates.

It is a further object of this invention to provide such a device and method which can employ the selecting light beam itself as a source of electrical power for optical transmission of a response communication.

These and other objects, features, and advantages of the present tagging and identification device and method, as well as the advantages thereof over existing prior art, which will become apparent from the description to follow, are accomplished by the novel improvements described in this specification and as described in the following detailed description which fully discloses the invention, which however in no manner should be considered as placing any limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting.

DETAILED DESCRIPTION OF THE PREFERRED EMBODIMENTS OF THE INVENTION

Figure 1:
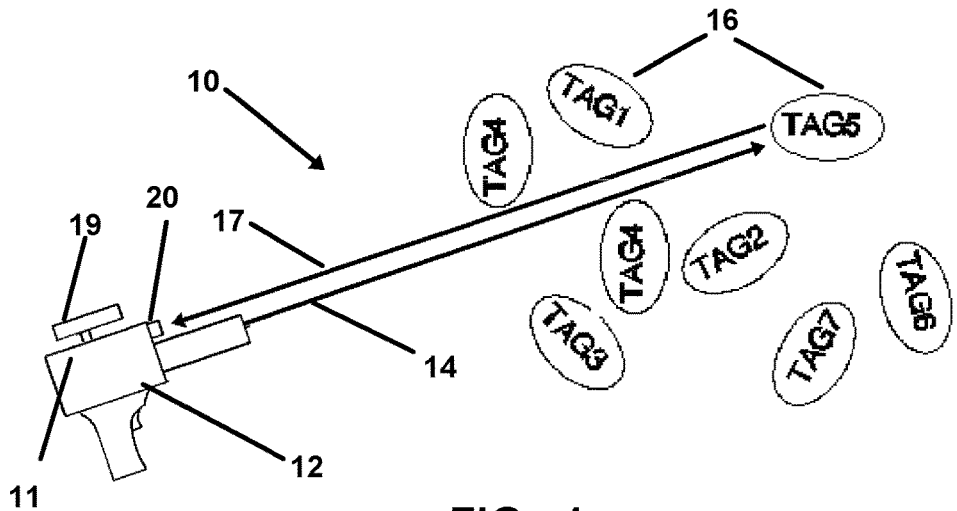
FIG. 1 depicts the device and method herein allowing for user targeting and querying for information from a tagged object or animal at a distance and in close grouping.
Figure 2:
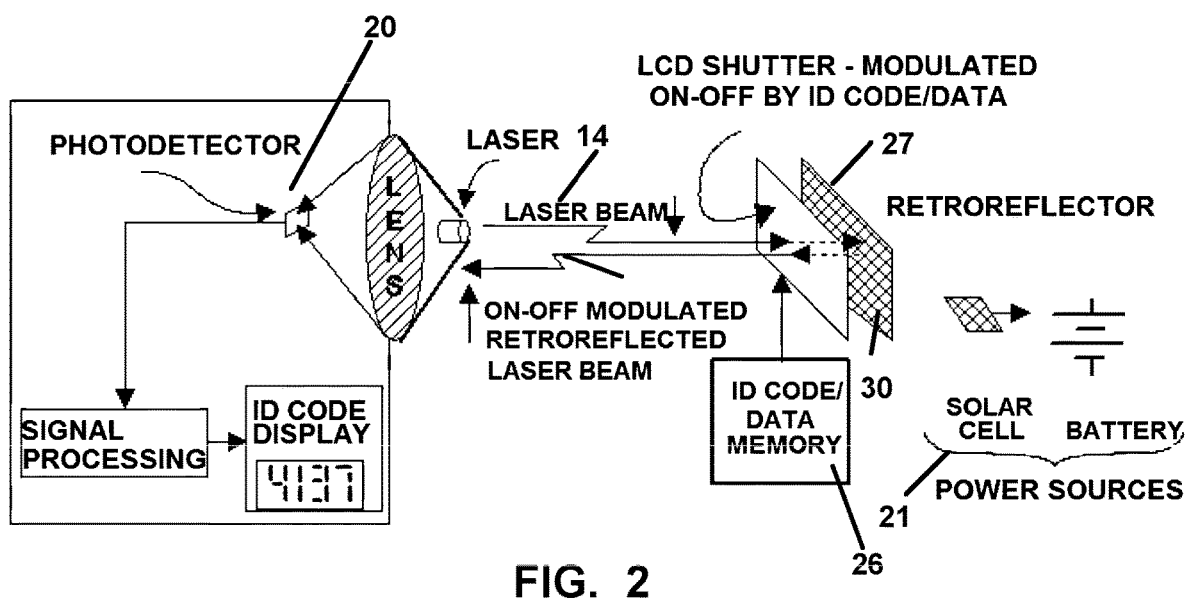
FIG. 2 is a depiction of the operation of the retro reflective tag mode of the system and device herein.
Figure 3:
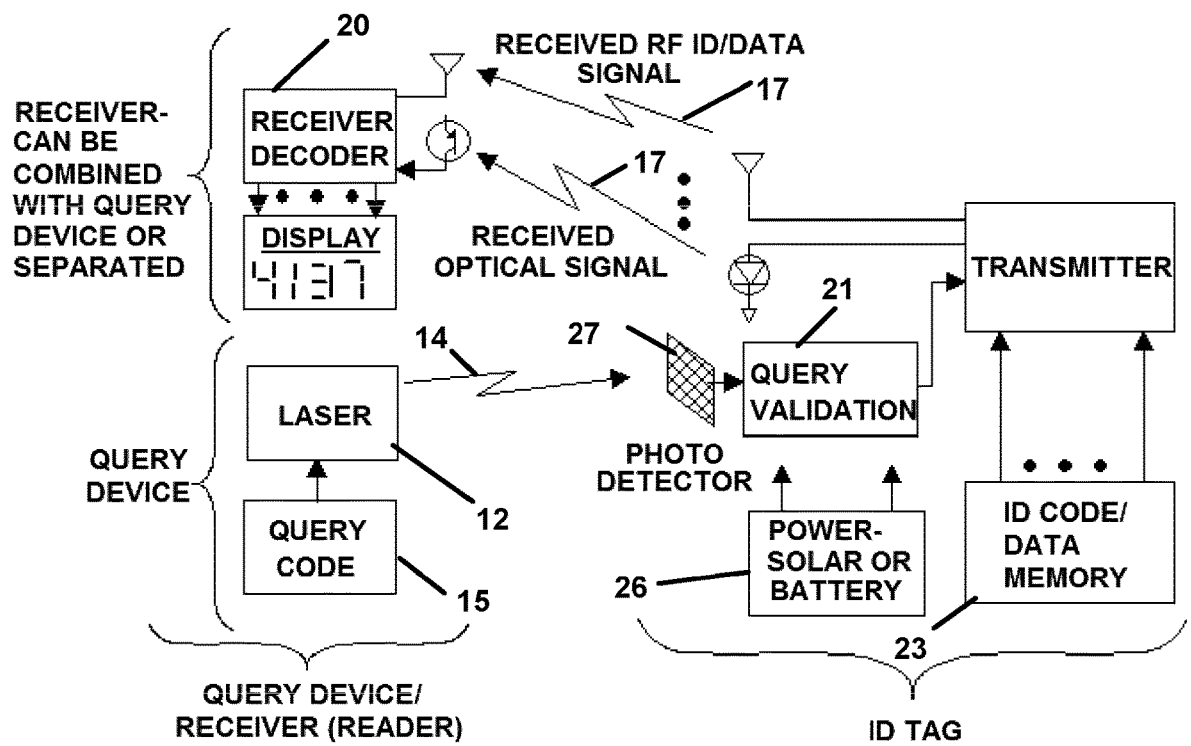
FIG. 3 shows the operation of the system herein in a non retro reflective mode.

In this description, the directional prepositions of up, upwardly, down, downwardly, front, back, top, upper, bottom, lower, left, right, and other such terms refer to the device or system as it is oriented and appears in the drawings and are used for convenience only. The employment of such terms, thus, is not intended to be limiting or to imply that the device has to be used or positioned in any particular orientation.

In accordance with the purposes of the present invention, as embodied and broadly described herein and shown in FIGS. 1-8, the present invention provides a highly accurate system for user targeting of a single object, person, or animal, in a closely spaced group, positioned at a long distance from the inquiry position of the user, to obtain data or identification thereof. It should be again noted that the system employs a coherent energy beam of focused energy having a diameter on contact with a targeted tag 16, sufficient to communicate with a single tag 16 amongst many closely grouped and, while coherent light in the visually discernable spectrum is a favored mode due to the ability of the light contacting a target to be the means for targeting, a properly calibrated sight on a beam projecting component of a query component 11 allowing a user to target an individual animal or object tag 16 will also work with either a projected visible or non visible coherent energy or light beam, and such is anticipated in all modes of the system 11 herein.

The tags 16 may be adapted to engage with the animal or object using connectors, belts, pins, adhesive, or any other means for operative engagement to the respective animal or object which is suitable to the operating environment in which the tag 16 will be employed.

In one preferred mode of operation of the system 10, as can be discerned in FIGS. 1-5, a means for transmission of a coherent energy beam to a targeted tag 16 to a communication therewith in a cross sectional area is shown as a laser 14 beam from a query component 11. The communicated outgoing laser 14 beam can be adapted to communicate a query code 15 which is modulated onto the outgoing laser 14 beam, or coherent beam light signal in the 350 nm to 750 nm frequency range, so as to be visible to a human upon contact with a surface of a tag 16. Where a non-visible coherent light or energy beam is projected from the query component 11, a sight 19 thereon calibrated to the landing communication position for a cross sectional area of the projected beam can be employed. Visually viewing the contact point of the laser 14, or viewing the calibrated contact surface of the sighted tag 16 through the sight 19, will allow the user to choose and target an individual animal or object bearing a tag 16, in real time, by viewing the cross sectional communication of the distal end of the laser 14 or the contact surface through a calibrated sight 19 for the communication point of the projected coherent energy beam such as a low power laser 14 or other coherent light or projected coherent energy beam which will not harm the targeted animal or object.

The sight 19 may be a telescopic or magnified sight and can be employed by the user to aim the projected beam from the query component 11 by discerning where the projected light, energy beam, or laser 14 will contact with the animal and tag 16 of choice. Such coherent energy or light shown as laser 14 light may be generated, for example, by a laser diode which will easily produce a beam of light reaching hundreds or thousands of yards using less than one watt of electrical energy. As noted above, it is well known to those skilled in the art that lenses and apertures, frequency changes, and other means for focusing 13 the coherent beam projected to achieve a desired cross section or diameter on contact with the target, can be employed to widen or narrow the diameter of the cross section of the projected beam on contact with a target at various ranges, and such may be included as part of the laser or beam projecting device employed on the query component 11 herein. Employment of such a means for focusing 13 can, for instance, allow formation of the cross section on contact with a target between ½ inch to 24 inches or more, depending on the distance of the target and closeness of the group of tags 16. Such is anticipated as a good range for the targeted cross section.

Using an onboard processor running software adapted to the task of validation of an incoming query signal or query code 15, in a received signal carried within the coherent light beam or laser 14, the query code 15 may be validated 21 by the tag 16 before initiating the return transmission or response signal 17 to a receiving device or reader 20 which will communicate the response to discern an identifier and/or other data from electronic memory 23 occurs. Of course, in the simplest mode of the system 11, where security is not an issue, the actual receipt of a communication of the beam of coherent light or focused energy, by the tag 16 alone, may be sufficient to elicit the response signal 17, and such could be employed in low security instances.

In order to have some form of control over whether a non-retro reflective tag 16 transmits to store tag-stored energy 26 within a battery or capacitor or other means for stored electric power, and to avoid interference from multiple simultaneous tag transmissions, the system 10 may employ some form of electronic circuit or software configured for decision/validation 21 when a valid query code 15, transmitted within the outgoing laser 14 or light beam, has been received by the light or other photo detector 27 or sensor producing an electric signal employable to ascertain receipt of the beam by the tag 16. This, as noted, may be software-based or by electronic reader adapted to discern only the query code 15 to close a switch, or by other means as would occur to those skilled in the art.

As noted in the figures herein, this query code 15 and its validation 21 control electronics in the tag 16 to prevent a response signal 17 to invalid inquiries. It will be appreciated that this validation 21 can be accomplished in many ways as would occur to those in the art where data can be encoded into a coherent light beam, such as 1) ascertaining arrival of a sufficiently strong light signal at an expected wavelength between 350 nm and 750 nm, 2) using a modulated signal carried on the beam of cohering light or laser 14, which can include a coded sequence such as a simple digital or on-off square wave modulation of the laser 14 communication, such as a 38 KHZ ON-OFF modulation of the laser 14 communication, or 3) other modulation of a coherent light beam or laser 14 transmission from the query component 11 employed by the user targeting a tag 16 visually or with a sight 19. The use of cryptographic query signals might also be employed as described elsewhere in this application.

In modes of the system 10 herein employing a non-retro reflective response signal 17, the outgoing light beam or laser 14 from the query component 11 bearing a query code 15, and the receiver 20 for the response signal 17, do not have to be co-located as they do in the retro-reflective mode. (The retro-reflector 30 reflects the signal back in substantially the same direction of origination so its receiver 20 must be substantially at that location.) Because the query component 11 transmitting the coherent light beam or laser 14 employed by a user in targeting a tag 16 and the receiver 20 do not have to be co-located in the non retro-reflective mode of the system 10, they may be physically separated, if desired, or if such provides a data gathering advantage.

Furthermore, the user-targeted query component 11 generating the targeted coherent light beam or laser 14 may have an associated receiver 20 for responding information communicated in the response signal 17 from a queried tag 16, or the receiver 20 might be remotely located from the coherent light beam or laser 14 generated from the query component 11, and/or multiple receivers 20 might be employed for gathering data in the response signal 17. These multiple receivers 20, and the user-activated and targeted query component 11 generating the coherent light beam or laser 14, can be networked, or they may communicate with each other as described elsewhere herein.

In modes of the system 10 where the response signal 17 is encoded with an identifier or other ID signal which will return directly to the querying device 11 which has an onboard reader 20, such a response reader 20 can be equipped with electronic means to discern the communicated identifier or ID signal carried in the response signal 17. Such an electronic means to discern can include one or a combination of a radio-frequency receiving device for a radio-frequency response signal 17 if employed instead of or in combination with an optical response signal 17 bearing an identifier or other ID data, or the reader 20 may simply employ an optical signal receiving means for reading an optical response signal 17 having an identifier or ID signal and generating an electronic signal relating thereto. Such an optical signal, as noted, may be generated by an LED or other means for light projection operatively engaged on the tag 16, or may be provided, as noted, by the coherent light or laser 14 from the querying device 11 employed by the user in targeting the object or animal bearing the responding tag 16.

In another mode of the system, a simplified reader 20 and/or query component 11 may be employed which only triggers the response signal 17 bearing the identifier communication from a tag 16, but does not actually read it or discern from stored data or a database the associated object or animal to the tag 16. For example, a laser 14 carried query code 15 or signal to the user-identified tag 16 can be communicated from the query component 11 to the targeted tag 16 which can respond by emitting a response signal 17 bearing the tag identifier which is actually received by a response receiving means or receiver 20 at another location or at multiple other locations.

One such use, of many uses, would be the employment of a laser query component 11, having a means to generate a coherent projected energy beam 12, such as the laser 14, which can be targeted by the user in real time to a tag 16 on a targeted animal or object, to choose and identify multiple individual animals being off-loaded from a truck. The trigger generating a laser 14 communication from the query component 11 can trigger communication of response signals 17 bearing identifiers or ID signals from the animals one at a time as they are individually targeted by the user. The response signals 17 bearing the tag 16 identifier or ID signals can concurrently be picked up by a receiver 20 more proximate to the targeted animal which is in communication with an animal inventory computer system. The important point in this aspect of the invention is that the query component 11 that triggers the identifier or the ID signals to be emitted does not have to have ID-signal receiver 20 means attached to it, although it can. Additionally, the response signals 17 may be optical or low power RF. This allows for instance a user to target animals with tags 16 across a 100 yard arena and nearby proximate receivers 20 such as surrounding a corral or pen, which will communicate the identifier of the tags 16 of targeted animals to local receivers 20 which can communicate over a network to computing devices which can employ the information as needed concerning the animals. Thus, one user, even many yards away, can ascertain and target the animals requiring a communicated tag 16 identifier to be communicated and then initiate the response signals 17 as needed by targeting the tags 16 by a user.

In another mode, the user query component 11 can have a receiver 20 for the response signals 17 bearing the identifier or data or ID signals concurrently with additional receivers 20 which are also receiving the same tag 16 identifier and data in the response signal 17. There does not need to be a one to one correspondence between the user-triggered query component 11 and a receiver 20. Furthermore, there can be multiple combination reader/query components 11 operating at the same general time. This can be done by simple coordination so that response signals 17 bearing identifiers are not emitted simultaneously or if they are, those identifiers in the response signals 17 are communicated to a buffer or in a way similar to the manner ethernet data collisions are avoided. In the example identifying a group of animals being off loaded from a truck, two or more users can employ query components 11 to trigger response signals 17 bearing identifiers from animals bearing tags 16 but situated on different sides of the herd or group of animals.

Figure 4:
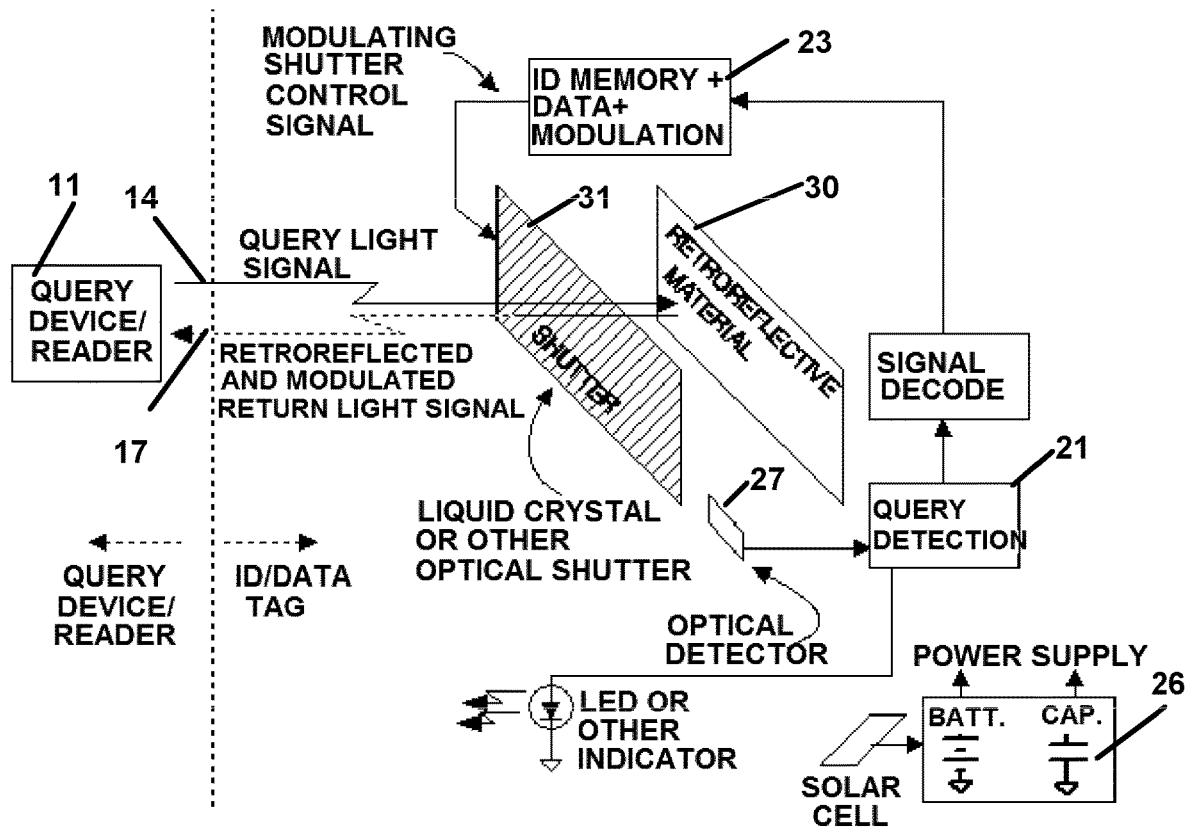
FIG. 4 depicts the operation of the system using retro reflected communications of tag identifiers and/or data concerning the animal or object attached thereto.
Figure 5:
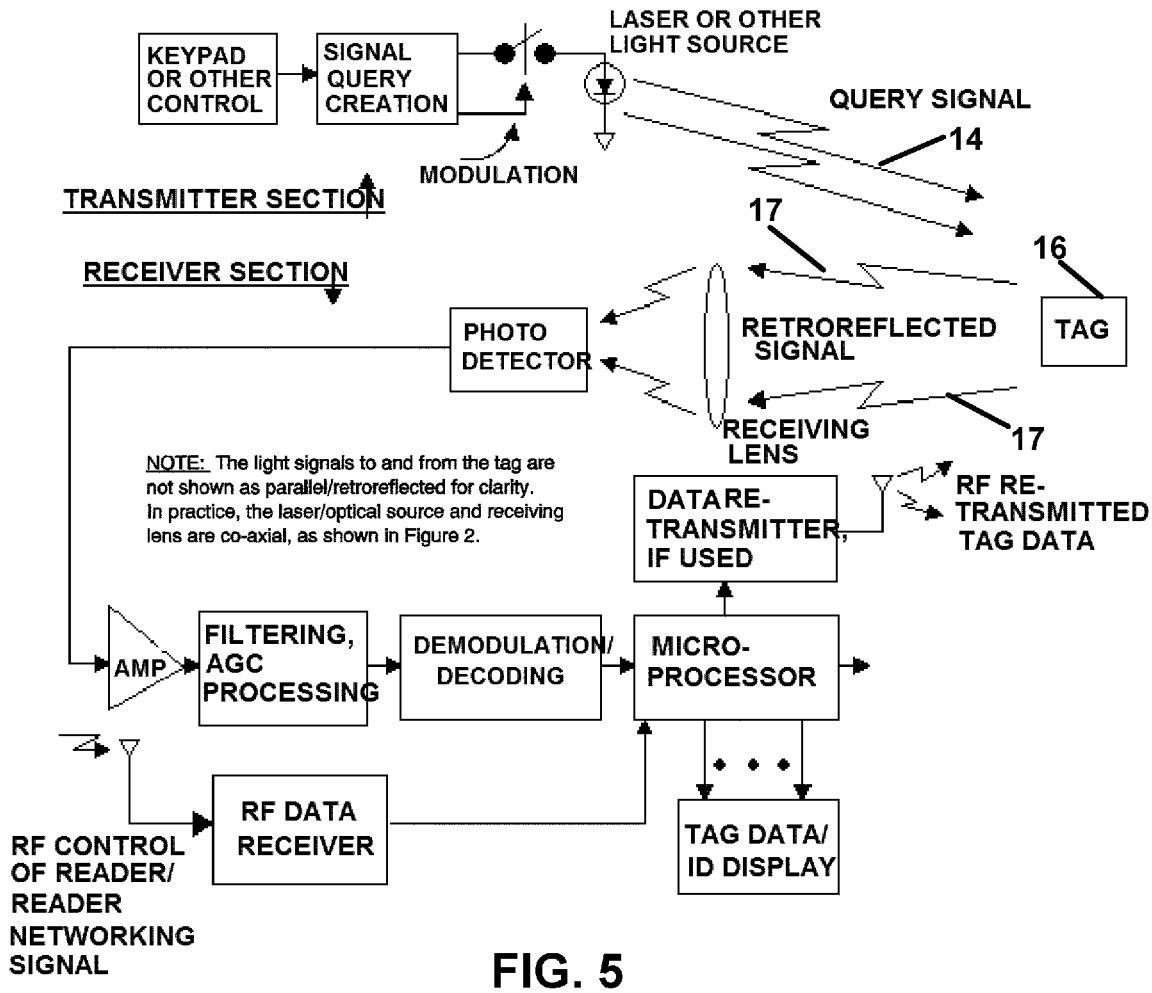
FIG. 5 shows a graphic rendition of one manner of operation of the user targetable query component and reader subsystems employable for response communications.

In the retro-reflected mode of the system 10 herein, such as shown in FIG. 4, because the retro reflected response signals 17 bearing the identifier and/or data communicate substantially back in the direction of the source of the emitted coherent light or laser 14 from a query component 11 which may be combined with both the laser 14 and reader 20, multiple query component/readers can operate simultaneously. Such a mode will operate even when multiple users employ query components 11 to elicit response signals 17 from the same tag 16 at the same time. This is because the response signal 17, from each respective retro-reflected light source, returns only in a direction substantially toward that source from the individual query component 11, and not in the other directions where other readers 20 on other query components 11 may be operating.

Security Encrypted Signals

The query signal or query code 15 of the system 10 herein can be very simple or it can have various levels of complexity to avoid false or unwanted triggering of response signals 17 and carried identifiers, data, or other ID signals. The query code 15 can also be encrypted so that a triggered response signal 17 will only occur when a secure, valid query code 15 is sent and discerned by the software or electronics adapted to discern validity on a receiving tag 16.

For example, in the laser 14 transmission resulting in a retro reflective implementation of the system 10, such can be used as a means for identification, such as friend-or-foe "IFF" for soldiers, vehicles or other objects which are targeted with the laser 14 from a query component 11 by a user. It is important in this case that a proper response only occurs when the tag 16 targeted ascertains onboard that a secure valid query code 15 has been received, because the response signal 17 bearing an identifier or other ID response could otherwise be used by a foe to locate soldiers, equipment, etc.

This is true both where the optical light is communicated from a query component 11 to generate an optical response signal 17 or an RF response signal 17, but it is particularly true for the retro reflective response signal 17 generated by reflecting the laser 14 communication from a query component 11. In this mode of the system 10, the ID tag 16 would be maintained in a de-energized non-reflective state until a valid query code 15 is discerned, by software or electronic means, as having been received, which will then cause the modulated retro reflective response signal 17. This is preferable because if the tag 16 were in a retro reflective state at other times, unauthorized parties could search a retro reflective enabled tag 16 and, by so doing, discover the position of soldiers or objects. While the user of the query component 11 in this mode would be revealing their own position, it is advantageous for the tag 16 to switch into the retro reflective reflected-light-modulated mode when a valid query code 15 arrives. For severe security situations, where a tag 15 position should not be available to anyone, the tag 15 can be covered or switched off.

While the simplest mode of the system 10 herein employs a simple query code 15 which once discerned as valid elicits the response signal 17 bearing a transmitted identifier or ID signal, which can be an individual ID or a group ID code, or other data which may be read or related to databases stored in electronic memory, more complex schemes are employable and anticipated. More complex query codes 15 may be employed to control the amount and type of information returned in a response signal 17, which can include combinations of identifiers, ID codes, and/or other data to which the query code 15 identifies as authorized for communication to the user with the respective query code 15. For example, where the system 10 is employed for the identification of livestock at a distance, users with a minimum clearance may be given a query component 11 which generates a query code 15 which software or electronic switching on the tag 16 discerns. In responding to a query code 15 which relates to a minimum level, an animal identifier might be the only data provided in the response signal 17 to the targeted query sent by the user. Alternatively, for example, when a user uses the laser 14 of a query component 11 to target the tag 16 worn by an individual animal while looking for sick animals, the query code 15 may be encoded with instructions or relational information causing the tag 16 to send a response signal 17 with an identifier and a body temperature from an onboard thermometer, or just the body temperature of the animal wearing the targeted tag 16. Thus the user can employ the identifier with a relational database to identify the animal wearing the responding tag 16 and track their temperature over time, or discern in real time the animal is ill.

Alternatively, the system 10 might be employed where a particular animal, targeted by the query component 11 of a user for a response, is known to be sick. In this case, the query code 15 carried by the light communication or laser 14 can be directed to the tag 16 of the selected target animal by the user and can carry data discerned by software or electronics operative on the tag 16 to command a small emitting device, such as a light-emitting diode, to illuminate or to flash as a visually discernable identifier of that particular animal discernable by the user and third parties not having the query component 11. Subsequently, a third party, such as an animal handler, can discern visually in real time which animal from the group is identified as sick from the illuminated tag 16 so that it can be treated or separated from the group. The same system of identification may be accomplished with objects bearing tags 16 where the user targets an object of choice to elicit an illumination or blinking of an illumination means subsequently viewable by others.

In another mode of the system 10, an identifying light emitter, on a tag 16 of the system herein, can be switched on in a non ID-specific manner while still operating when targeted by a query component 11. For example, in an automated milking parlor where, by temperature or by automated testing of the milk for mastitis or some other illness, the parlor detects a sick animal By identifying the animal, and the tag 16 related thereto, and then employing an RF or optical signal that is selectively broadcast to be discerned as a valid query code 15 only by the tag 16 of the identified particular animal (this can be done with a very short-range RF transmitter or wideband optical transmission,) the illuminating or light emitting component 22 such as an LED on the tag 16 of the sick animal can be energized and be an identifier visually-discernable by handlers so they may treat the animal or separate it. Again, this can be done with user targeting of the tag 16 of the animal or by transmitting a special secondary query signal to the tag 16 which has been identified as associated with the individual animal to thereby illuminate the identifier light on the tag 16.

Also, switching on the power of a tag 16 powering the illumination of a light-emitting component 22 of the tag 16 of one or a plurality of animals can be used for a variety of purposes, rather than just for sick animals. Other such purposes include identifying an animal in estrus, identifying a cow-calf pair, etc. Thus, the tag 16 employed for user targeting of individual animals for information using a query component 11 may also be employed in a non targeted fashion based on other factors. Similarly, objects bearing tags 16 can also have visible lights which are energized for visibly locating one or a plurality of objects. One example would be causing the onboard power on a tag 16 to energize a light engaged thereto on a tag 16 engaged with a particular box in a warehouse thus making it easier for workers to find.

In the case of the system 10 employing a retro-reflective ID response transmission where a light signal from a query component 11 yields a light signal response mode of the system 11, the retro reflected light communicates back to the location and direction of the querying light means which can also be called the "ready." In the case of narrow-beam width query with a non-narrow beamwidth response, the ID, ID plus data, or data only signal can reply to multiple receivers of the response signal. So, for example, the response signal can communicate to the querying means and it can also be received by other receivers, such as a receiver for a computer with a database. In an mode of the system in this operation, an animal handler with a reader or query component 11 targets individual animals and communicates light to query the tags of animals one by one and a nearby receiver receives the response data and enters it into a computer database. The query component/reader can simultaneously receive the same tag data, but a very simple less expensive query component 11 does not require the receiving means while still allowing the user to discern the animal or animals of interest within a group so as to elicit information concerning them. In this case, the query component 11 simply causes each tag to ascertain the query from the user and the response information goes to the receiving means nearby. There can be multiple receiving locations that all receive the tag response communications and this can include other query components 11.

In the case of the retro reflective light-out yielding a light-response mode of the system 10, the response signal 17 communicated from the targeted tag 16 is communicated back to the query component 11 communicating the light based query code 15 to that tag 16. Once the query component 11 has decoded the response signal 17 from the queried tag 16, the query component 11 can be configured with operative wireless or wired communication components to retransmit the data from the response signal 17 wirelessly or by other means to other nearby receivers.

For example, the query component 11 can be employed by a user to use the sight 19, or to communicate the light or laser 14 to targets, and thereby identify individual animals or objects bearing tags 16 eliciting a response signal 17 which can include in an identifier or ID code plus other data or data or an identifier only. The response signal 17 triggered from the tag 16 can then be communicated in a subsequent transmission to other receiving means. A practical use of this aspect of the system 10 is the case of identifying, with the retro reflective embodiment of the system 10, animals that are being offloaded from transport. As each animal is offloaded, it is targeted with the laser 14 by the user with outgoing light signals bearing the query code 15 to elicit a response. The user-employed query component 11 with a reader 20 then receives the response signal 17 and tag data which can be re transmitted to a computer. Once received by the computer, the received data is entered into a computer database. In this way, the query component 11 is completely mobile and can move around with the user who may target and identify animals of interest and communicate the query code 15 using the directed light beam or laser 14 thereto, while the computer and database are in a remote location receive the data from the elicited response signals 17 without needing to see the animals or objects.

There are several methods for searching within a group of tags 16 engaged on animals or objects to find a tag 15 having a specific identifier. One method is simply for the user to employ the light beam or laser 14 from the query component 11 to target an animal by communicating the narrow beam light to the area proximate to targeted animal's tag 16 or to employ the sight 19 which is calibrated to the landing spot for the coherent energy beam or light being projected from the query component 11. Then the user will discern the communicated response signal 17 for an identifier and repeat the process until the desired identifier is transmitted from a tag 16. The query component 11 in combination with a reader 20 for the response signal 17 can be pre-programmed to ascertain when a desired identifier is communicated to the reader 20 and then produce a visual, audible, or tactile signal or combination thereof, thereby providing the user an automatic indication they have targeted and found the animal of interest.

Another method is to program a signal into the query code of the laser communication which, when received by a particular tag 16 bearing the desired identifier, will cause the tag 16 to energize and generate a visually discernable signal such as an illuminated or blinking LED from the targeted tag 16 itself in response to a light-communicated query code 15 having the switching instruction.

Another mode of employment of a visually discernable tag 16 indicator such as means for illumination would be to communicate, to electronic memory of the query component 11 of the user, the identifiers of those tags 16 which have already been successfully read. In this case, when the user targets an animal of interest with the query component 11, and the query component 11 uses onboard software to compare the identifier of a response signal 17 to the identifiers stored in memory as having already been received, the query component 11 can send a second signal in the light or laser 14 communication to the tag 16 to energize a visually discernable indicator. The visually discernable indicator or illuminating component 22, such as a flashing LED, would then provide the user real time visual confirmation that the information of an animal has been received to eliminate duplication of effort while surveying large herds of close moving animals as the user can look for non illuminated tags 16 to query.

In another operational mode of the system 10, engaged tags 16 can combine communication methods. A tag 16 can have both retro reflective optical communications as in FIG. 4, and radio-frequency communications as noted in FIG. 5, and, if desired, the radio frequency communications may also operate in multiple modes. As an example, the tag 16 can be configured to provide a response signal 17 to a targeted communication of a query code 15, communicated in a laser 14 communication, at two or more different frequencies with two or more modulations, etc.

As noted above, electric power for the system 10 for a tag 16 to operate and to communicate a response signal 17 to a received laser or light query having a proper query code 15 can be provided by capturing energy from the laser 14 or directed light beam itself such as in a capacitor or battery, or can be provided by a battery or capacitor which is charged by a solar electrical generating component as in FIG. 4. This is true especially in the case of retro reflected response signals 17 since the shutter 31 which modulates the reflected light generating the response signal 17 can be extremely low power devices and use the energy from the communicated laser 14 or light beam itself for power. As noted, the shutter 31 could be a Liquid Crystal which can be varied in transparency or can be mechanical and thereby encode the data or identifier to the response signal 17 in the form of a returned laser modulated by the shutter 31 to encode it. However, in general, the tags 16 can be powered by stored-energy devices such as batteries, solar cells, capacitors, or by a combination of solar cells that recharge batteries and/or capacitors. The query components 11 would use the same means for electrical power and would work well with rechargeable batteries.

Figure 6:
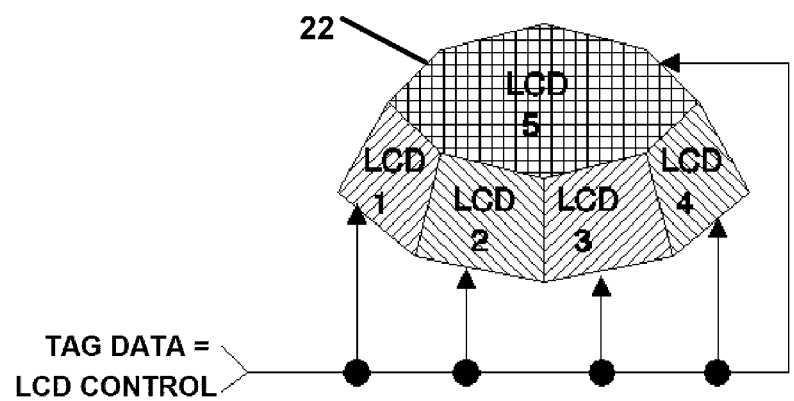
FIG. 6 shows a mode of retro reflective tag having multiple angled sides each having an led such as a pentagon, hexagon, decagon, or octagon, which is employable with the system herein to direct LED light at differing angles.

Shown in FIG. 6 shows a mode of an illuminating component 22 which can be employed with the device 10 herein in all modes, to provide an illumination signal. The illumination component 22 in FIG. 6 is especially preferred as it has multiple angled sides where each having an LED thereon. The angled shape of the sides would form a multi sided figure so that light is emitted in multiple individual directions from each side for better viewing from a distance. Currently it has been found through experimentation, that at least six sides each with an LED works well and up to eight sides continues to provide enhanced directional viewing.

Figure 7:
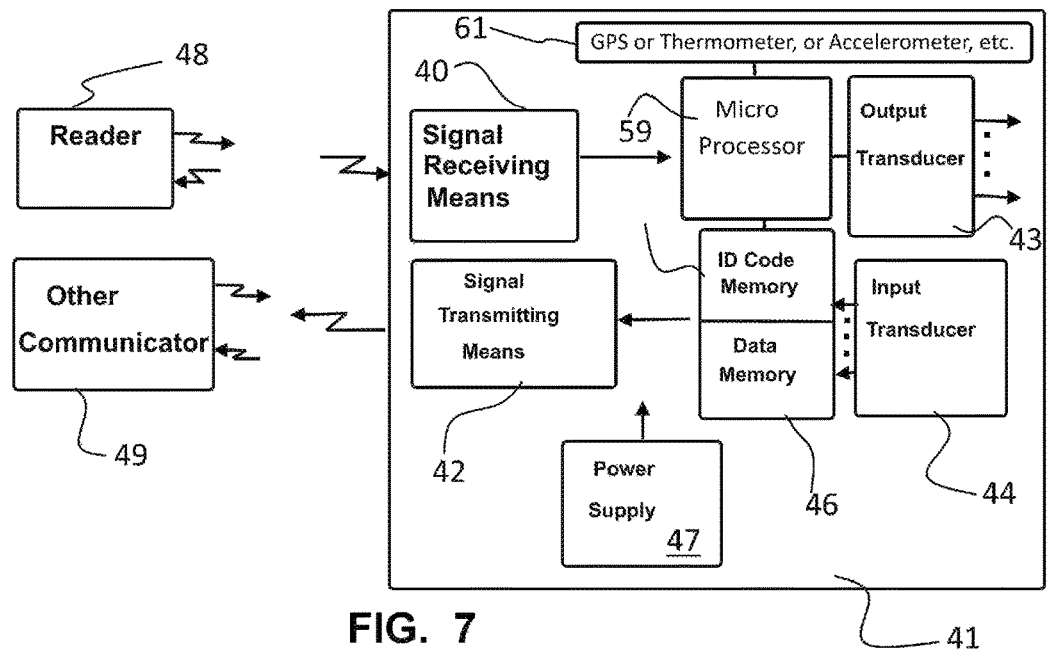
FIG. 7 depicts a block diagram of the basic electronic tag and also shows the system with a reader means and other communication means.
Figure 8:
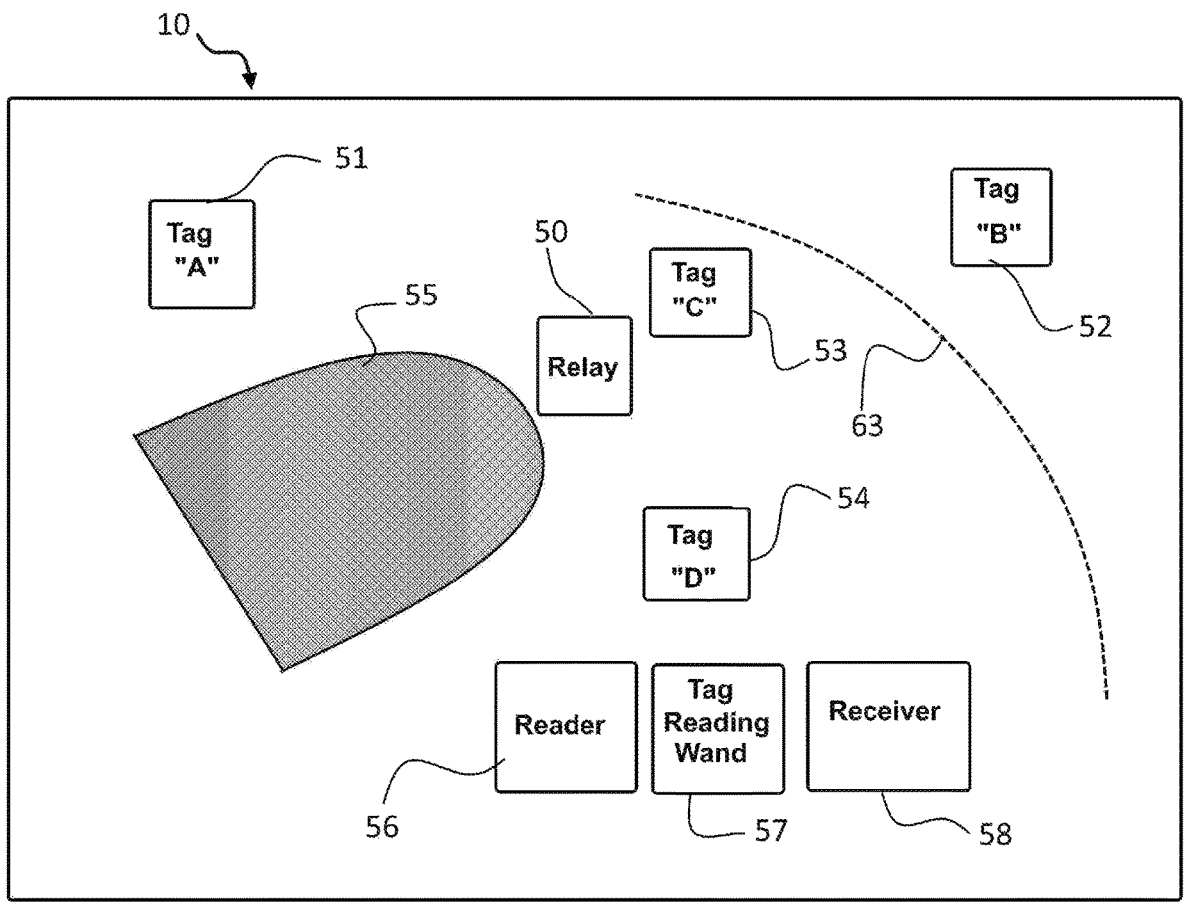
FIG. 8 illustrates how tags on animals, or other communications nodes, can relay information to extend communications or to communicate around areas or obstacles that would otherwise block the signal.

In a particularly preferred mode of the system herein shown in FIGS. 7 and 8, the system can be configured to communicate with the various tags on animals where obstacles to communication signals exist which was found in experimentation to pose a significant problem for the system due to the fact that feed lots and farms and the like have many structures which impeded wireless communications. As shown, FIG. 7 depicts a signal receiving means 40 which receives a wireless signal which commands the tag 41 to perform various actions as described herein. Also shown in FIG. 7 is a signal transmitting means 42 which transmits signals which may include identification codes for the tag 41 and other data of various sorts, and re transmissions as described herein.

The signal receiving means 40 may include one or a combination of signaling components from a group including optical signal receiving means, such as photo transistors or photo diodes; electromagnetic receiving means such as an inductive coil, or an antenna for a radio frequency signal, or audible or non-audible audio signal receiving means such as a microphone; or other signal receiving means. One or more of the signal receiving means 40 described above may be combined so that the signal receiving means 40 can receive signals by more than one type of optical, RF, or sonic signal for example. In the preferred embodiment of the invention, a signal from an optical detection means for receiving a laser trigger signal is combined with wireless RF or radio-frequency receiver, so that individual tags can be triggered and/or controlled by a laser signal or by radio-frequency signals. The signal receiving means 40 will usually include signal amplifiers and signal demodulators and may include frequency-conversion means as typically used in radio-frequency receivers all of which are well known in the art.

The receiving means 40 will typically include an transducer 44, such as an antenna, an optical transducer, such as a photo transistor or photo diode; a microphone, or other signal reception means which converts a transmitted wireless electronic signal to an electronic signal employed by the components of the tag 41. Such an input transducer 44 is conventionally operatively connected to an amplifier which amplifies the received energy after it is converted by the transducer to a more convenient electronic signal employable by tag 41 components. This signal is then processed, demodulated and reduced to the desired data or commands in the usual manner well known by those skilled in the art.

Similarly, the signal transmitting means 42 can include one or a combination of transmitters from a group including optical transmitting means such as light-emitting diodes, lasers, or modulated reflecting means such as liquid-crystal shutters in front of retro reflectors; audio transmitting means such as piezoelectric buzzers of speakers, electromagnetic transmitting means such as antennas or inductive coils, or other transmitting means. Signal processing, including modulation, frequency conversion where necessary or convenient, and signal amplification will typically be used in the transmitting means. In the preferred embodiment of the invention, the data to be transmitted by the signal transmitting means 42 modulates a radio frequency carrier, and this signal is then amplified and transmitted by an antenna.

As shown in FIG. 7, output transducer means 43, can be activated by the tag 41 based on various parameters or commands to provide an output signal or communication from the tag 41, or to implement other commanded actions, such as a retransmission of a signal intended for a different tag. The input transducer means 44 can also include electronic components to measure various parameters, which may include temperatures, physical motions, and various other parameters of the animal or object the tag is attached to, or various environmental parameters, such as ambient temperature, pressure, humidity, gas compositions, etc. Thus the input transducer 44 can include multiple electronic components adapted to ascertain and generate an electronic signal relating to any of the noted parameters, which can be employed by the tag 41, or communicated by the tag 41 in a transmission signal to a receiver.

In operation when the signal receiving means 40 has received a valid wireless signal, the tag 41 using software running in memory engaged to a microprocessor which is configured to perform the action relating to the received signal. This may include one or more actions. A distinction is made between the signal reception transducers, such as antennas, optical receivers, etc., contained in the signal receiving means 40, and the input transducer 44 and the output transducer 43 which perform commanded actions and measure parameters.

The tag 41 will include a power supply means 47, such as a battery or slow discharge capacitor provide power to the tag 41. This power can include individually or in combination: solar-cells, batteries, capacitors, radio-frequency energy-scavenging means, mechanical-motion energy-scavenging means, or other powering methods. The tags 41 can be powered from a tag reading signal, such as a laser beam or other optical signals, radio-frequency reading signals, etc.

Additionally preferred is for the tags 41 to have various implementations with various combinations of features. In a preferred embodiment of the invention, the tag 41 includes a microprocessor with memory operatively engaged, which is adapted to run software for to operate the system herein in the various modes taught. For example a model CC1110 or CC2510 integrated circuit as sold by Texas Instruments, the specifications therefor being made part hereof, provides for a "system-on-a-chip" with internal master and slave operation adapted including components for wireless communication with integrated circuits, or similar device from other manufacturers or other vendors are used in both readers and tags and other communications devices in the system. These devices include secure encryption of information, forward error correction, detection of valid data, information packet formation, memory for controlling the device, radio receiver and transmitter, analog-to-digital conversion, and temperature measurement.

Software running in memory 45 and 46, which is in operative communication with the microprocessor 59 and power supply 47, can be adapted to implement Tag commands may include for example commands to:

transmit an ID code from the ID Code memory 45, transmit data stored in the Data Memory 46, cause the measurement of data measured by input transducer means 44, detect metadata or an signal handshake and relay data transmissions to other tags or other communications systems, activate a transducer such as a light or sound transducer on the tag, activate other transducers such as the output transducer means 43, store data and commands in electronic memory 46 on the tag 41, perform other actions.

Such other actions would be enabled by software running in electronic memory 46 and on the microprocessor 59 and examples of these and other actions are described below.

In one mode an gaze attraction noise on receivers or readers 48. When animals are accustomed to the presence of a reader 48, they may not look at it. Looking at the reader 48 can help with ear-mounted tags, since the animal points its head and its ears toward the reader when it is looking at it. The reader 48 therefor can be adapted with a transducer such as a speaker or buzzer or the like, and can emit a sound to cause an animal to gaze at the reader 48, thus pointing its head and/or ears and the tag 41 toward the reader.

In another mode the tag 41 can be adapted to generate a sound to which the animal is predisposed to act in a certain way, such as heading to the barn. Animals can be trained to associate a particular sound with feed or something else that they like. If they hear this sound consistently when fed "at the barn" or some other desired location, then later this sound can be emitted from the tag, causing the animals to move toward the location they were trained to associate with food or other motivating factors by this sound. In this fashion, using software running in electronic memory 46 and on the microprocessor 59, the tag 41 can be enabled to emit a particular sound stored as a digital file in memory 46, upon receipt of a particular signal to do so from the system. In this fashion the animals can be electronically called to that location which the animals associate with the sound.

Because animals can be trained to associate a sound with something desirable such as feed, they can also be trained to associate a sound with moving in the wrong direction so they will change directions. An example of such a sound might be a buzzing-like noise similar to a fly. When an animal is moving in an undesired direction, the tag 41 employing software running on the microprocessor and in memory 46 can be made to cause a transducer on the tag 41 to emit this sound that the animal associates with a "wrong direction", causing the animal to move in a more desired direction. In this sense, the sound is like a command that causes the animal to change direction or some other behavior. Additional sounds can be added to the tag 41 and held in digital files in electronic memory 46 which can be triggered by a wireless signal and will cause the animal to move left or right, etc., up to the animal's ability to respond to different sounds. This will enable the tags 41 to become an "electronic fence" system and to electronically herd or move animals, or to cause the animals to start or stop or modify other behaviors. Other sounds can be used for other commands to animals or as control tones to control devices. In another mode, employing a transducer 43 adapted to output a mechanical vibration of the tag 41, it may be used in combination with or instead of sounds for controlling animal behavior.

In another preferred mode, the tag 41 engaged with a particular animal or object can be commanded to illuminate a light, such as a light-emitting diode (LED) or to trigger a buzzer or small speaker or other sound-emitting device to aid in locating that animal or object. The light or sound-emitting device can be turned on steadily or caused to be on and off, or to flash or emit bursts of sound. A buzzer or other output transducer 43 providing a sound-emitting device can be used with or instead of such a light to help locate a sought-after animal or object.

In the mode of the device of FIGS. 1-6, the previous patent application, directed energy beam is used to select an individual tag 41 as a trigger or command to perform an action, such as transmitting its identification code. Employing the tags 41 of the system as in FIG. 7-8, tags 41 can be selected in the same manner, or by another manner, or, the tags may communicate without being selected. In the case of communications when individual tags have not been selected and triggered with a wireless signal, tags 41 can communicate after receiving a command that is received by more than one tag, or they can communicate based on timers running on the tag such as on the microprocessor, or other parameters.

Tags 41 can then begin to communicate, with each tag 41 waiting for a time that is either random or pre-selected for that tag 41, thus spacing out the transmissions from each tag as necessary. When two or more tags attempt to communicate at the same time, this message collision can be detected, and the tags can restart their wait-to-transmit timers and retransmit, in a manner similar to the message retransmission used in Ethernet systems.

Also, with the invention, when a particular tag 41 transmits, it can initiate a marker such as metadata in the leading end of the transmission, which shows which particular tag 41 is communicating. This indicator if not a wireless transmission of data, can also be visual, such as a light, or audible, such as a buzzer, or some other form of indication. In the preferred embodiment, when a tag 41 communicates, it can light an indicator light, such as a visible or infrared light-emitting diode, which will indicate that particular tag is transmitting its identification code or other information.

Employing this method, when a tag 41 within a closely-spaced group transmits a signal or communication, it is possible to determine which tag 41 from the plurality engaged with the group, is communicating without having specifically selected that tag. For example, if the identities of a cow-calf pair are desired, a command transmitted from the reader 48 or communication means 49 can cause every tag 41 within the activation distance of a reader 48 to transmit its ID code. As each tag 41 transmits after its respective timer has waited the designated time duration for that tag 41, the indicator, such as the described light, can indicate that tag is transmitting. In this manner, when the cow has a tag 41 which transmits its ID code, that code can be noted since the indicator will indicate that this tag is transmitting this time. Then, the same thing can be done when the calf transmits its ID code. In a similar manner, the identification of specific tags, animals, or objects can be determined without triggering or commanding individual tags.

Still further, a small Global Positioning System (GPS) or other, Global Navigation Satellite System (GNSS), or Navigation System (NS) receiver to discern a terrestrial location as optional component 61, can be added to the tag 41 or work in conjunction with the tag 41 to determine and report the position of an animal or object. However, since GPS or GNSS or NS receivers use power, a tag 41 can be kept more power efficient by using another method of determining the tag's position as described herein. This can be done on a tag that has GPS, GNSS or NS location determination capability or on a tag 41 without such capability. These other methods can include using proximity reporting, as discussed further below, or time-of-arrival signal triangulation.

With proximity reporting, when a tag 41 is near a particular location having a proximity device with a known identification and location, the tag 41 can signal its identification and which proximity device it is near, or, the proximity device itself can record that particular tag 41 was or is proximate when the tag transmits. This can be done in a triggered or un triggered manner. For triangulation, when a tag reports its ID code or data, whether this reporting is triggered or automatic, multiple receivers can be used to determine times of arrivals, or time-of-arrival differences, to triangulate the position of the tag. In this case, since the tag is transmitting anyway for other reasons such as identification or data reporting, the triangulation can give the position of the tag without the tag needing to expend additional power as it would need to do with a GPS/GNS/NS receiver or other position-determining system on the tag. In this sense, the positioning communication does not require additional expended power to determine the tag's position once it transmits for other reasons. Such a triangulation system can still be used to determine the position of a tag by commanding that tag to transmit for the sake of determining its position. When this is done, energy is expended for positioning, and that position determination is not gratis with respect to energy expenditure.

In another mode of the system herein, multiple tags 41 can be networked together in a system such as a packet-communications or other network. This networking of tags 41 can provide redundant paths for information reporting or for improved reliability, the sharing of information, and for extending the range of communication with the tags. Networked tags 41 or communication relay devices can be on animals or objects, or they can be placed in other positions, moving or not moving. For example, in the case of livestock, existing tags 41 on other animals can communicate with each other. A tag 41 that is too distant from a communications center or reader can be reached by relaying information through the tags of other animals. However, it is also possible to place other tags or relay devices at useful locations, for example on certain fence posts, or on moving vehicles or with moving horses, dogs, or people, to communicate in this relayed fashion and to extend reading and communication distances.

In modes of the system employed on a group of animals or objects, a group read can be performed by initiating communication with a first tag 41 which is instructed using metadata or a signal handshake, to either read or to initiate reading for other tags 41 within communications range. For example, if the identities of animals or objects in a group wearing tags 41 are desired, a first tag 41 on one animal or object can be commanded to begin signaling and reading all of the animals in the group. This initial command can be done by directed energy communications, such as the laser communications with a tag 41 as described above, or it can be initiated in an undirected/unselected, Ethernet-like manner with any first tag 41 that is communicated with at random then commanding the other tags to report or communicate.

In an additional operation of the tags 41 herein such as shown in FIGS. 7 and 8, animal motion can be correlated with estrus, calving and/or with illness or other phenomena of interest. Tags 41 can be implemented with motion measurement and or detection such as with an optional component 61 in the form of an accelerometer engaged with the tag 41. With the motion and movement direction determined by the accelerometer, the information can be used to report on animal health, calving, estrus, animal excitement, etc. This can be done in a commanded fashion where the tag 41 is queried to report its data stored in memory 56, or it can be done automatically by reporting at timed or random intervals, or it can be done when data crosses thresholds determined by software running in memory on the microprocessor 59 that cause the information to be sent. An example of reporting based on thresholds is when the tag 41 reports automatically when the activity level is high enough to be a probable indication of estrus. When that level of motion is exceeded, the tag can be internally triggered to report. Similarly, low levels of motion can indicate sickness, and the tag can be triggered to report a low level of activity or a lack of activity. Also, certain types and frequencies of motion, such lying down and getting up, can be correlated with imminent calving or with other animal conditions.

In many cases with animals, the temperature in there environment is most important. Temperature can be monitored and reported by an operatively engaged optional component 61 in the form of an electronic thermometer engaged with the tag 41. A query signal sent to the tag 41 can cause it to report the temperature or it may be automatically reported in a transmission by time duration or by the temperature being outside of defined thresholds or at timed intervals determined by software running on the tag 41.

Differential temperatures, differentiated by comparison with ambient or other temperatures or differentiated by changes with time, can be used to detect animal health, including estrus. For example, an ear tag 41 can be implemented with a body temperature-measurement capability such as an electronic thermometer operative connected with memory and the microprocessor 59. The ear temperature may not be the same as the body core temperature because the ear is more exposed to the ambient temperature, but it can still be a useful indicator of animal health. A tag 41 can include software and electronic temperature measuring components to measure both the tag temperature and the ambient temperature, and this information can be used to obtain a reasonable indication of body temperature, or of body temperature changes, or of animal distress or other problems. If an animal has an elevated temperature, that information will have different meaning if the ambient temperature is −20 degrees Fahrenheit than if the ambient temperature is +100 degrees. However, with the information of both the ambient temperature and the animal temperature at the tag site, useful information can be obtained. Also, animal temperature that changes over time can be used, with or without the ambient temperature information, to estimate animal health and/or estrus or other conditions.

The tag 41 and system can also be enabled to measure exhaled or present or emitted gasses from the animal. The reported readings from such measurements can then be reported to detect hazards or illness. Gas hazards can be reported by tags on objects, people, or animals or by isolated tags.

Reporting for the tags 41 much like reporting noted above, can be triggered by directed-energy beams, such as laser 14 beams, or by directed queries; by group queries with Ethernet-like collision retransmission; by random timing; by proximity triggering; by timed reporting; by full or nearly full memory conditions; by triggering off of data thresholds or conditions; or by other methods which cause collected tag data and/or identity to be reported.

In another mode, a tag 41 for the ear of an animal can be located at the top of the ear, the mid portion of the ear, the bottom of the ear, or dangled below the ear. When the tag 41 is located at the top of the ear, it can be shaped so that a part of the tag goes over the top of the ear so that the weight of the tag is more distributed along the horizontal length of such a tag or along the top of the ear. This decreases the probability of the tag tearing out of the ear due to its weight. An ear-punch device that easily attaches such a tag can be used for quick and proper attachment of the tag.

In a mode with enhanced power supply 47, in addition to or instead of a primary battery, a tag can be powered by a solar cell or by a tag battery that can be recharged by a solar cell. (A primary battery is a non-rechargeable battery.) Also, a capacitor can be charged by a solar cell so that the capacitor provides the stored power for the tag. Scavenged electrical power from radio signals or animal motion or other power sources can also be used to power the tag and to recharge a battery or capacitor. Combinations of these tag power options are intended.

Still further, tags 41 can be made to include the United States "840 Federal Tag" requirements, and the electronic ID can be made to have the same ID number as that federal tag. For additional visual communication, the electronic ID number in the tag can simultaneously be encoded in multiple manners, including: Having the same number visually printed on the tag, having an injectable RFID unit with the same number, other means of putting the same ID number on the same animal or object.

Tag reading and communications can be initiated by a variety of means: triggering by: a light, laser, or other directed-reading beam; timed communications; radio-frequency-triggered communications; sensor threshold-crossing triggered communication or by other means. Sensor-triggering can occur from having a temperature or activity-level, or exhaled gas or other sensor's measured parameter cross a threshold that causes a need for communications, such as when a fever is detected or an activity level indicates illness, wounding, or estrus for animal uses or by other parameters for non-animal uses. Another method of triggering communications is by geographic position or proximity to or distance from a location, animal, or object. The proximity-triggered reading can trigger communication when a tag approaches or is at a specific location, such as a dairy stanchion or a watering location. Similarly, tags on objects can be read automatically, that is, triggered to communicate, when they are at or approach a specific location or other object, such as a doorway, a watering location, a specific fencepost, etc. Also, when an object begins to go too far from a defined location, this can trigger communications. This will allow tracking of objects or communicating with them when they depart an area or when they go away from other tags, people, animals, or locations. This can aid in theft prevention, as, for example, if an animal is being stolen from a given location. When an animal or object that is being stolen is taken out of a defined area, this can trigger communications that in essence reports that the animal or object is being moved outside of its defined, proper area. Automatic communications can be triggered when the tags are in proximity or out of proximity with locations, persons, animals, or objects.

In another mode of employment of the device herein, the tags 41 can be employed for child safety, theft prevention, or unauthorized movement uses. An out-of proximity triggering method can be used to cause the tag 41 to sound an alarm when a child or pet or other object leaves its designated area or when it goes too far from a parent or owner or other defined mobile or fixed location. In these circumstances, the tag 41 can simply transmit, or the transmission can be used for triangulation, or to report a navigation-system determined position, or the tag 41 can be emit a visual or audible or combined signal to immediately aid in finding the child, animal or object. Similarly, a command can be sent from a reader 56 or another tag 41, or a master tag, that will cause an alarm or other indicator to sound or go off to aid in finding a child, animal, or object either when desired or when it goes too far from defined locations as described above. Such safety or anti-theft tags can also be made to transmit their positions or to activate indicators such as sound or light, upon command Thus, if a user is concerned about the location of their child, animal, or possession, they can force the tag to report to determine its position, or to sound an alarm and or light a light or activate another indicator on the tag.

In all modes of the system and device herein the basic tag 41 having onboard memory 46 and 45 operatively engaged with a microprocessor 59, can include software programmed by other organizations to provide "applications" that suit their needs. Laser, radio-frequency, directed energy, or other readers 48 can be placed in locations for proximity-based reading as described above, or for range extension as also discussed below. Readers 48 can also be placed on other mobile platforms, including unmanned vehicles, which can approach a tag or a group of tags to read tags and/or to command actions and/or to transfer data. Readers 48 can also be placed on animals, so that a "lead animal" can be used to read the identities and communicate data with other animals or objects.

In one example a reader 48 can be operatively positioned on a trained animal such as a sheep dog or farm dog that will approach an animal or object having a tag 41 engaged, and read its identification and/or other data. Different types of readers 48 or communication triggers can be placed on the same tag. For example, a single tag 41 can be triggered by a laser 14 query beam as described above or by other wireless communication such as a radio-frequency query or command, by timed reporting of desired data, by sensor-threshold triggering, by proximity or distance triggering, or by other means.

Communication with tags 41 can be by random timing, as in an Ethernet-like system. Triggering transmissions from tags 41 of data to be communicated, can be used to start communications, or communications can be triggered by timers with random offsets. If there is a message collision (two tags attempting to communicate at the same time), then staggered retransmit times can be used as in Ethernet systems.

In many applications, as with small, lightweight tags 41 herein, with limited mass or weight available for a power supply 47 such as batteries, the amount of communication can be limited by battery capacity. In the case where batteries or other energy-storage devices, such as capacitors, are recharged by another source, such as solar-cells or by energy scavenging, communication can be limited to when the energy storage device is full by software running in memory 46 adapted to that task. For example when a tag 41 that is recharged by an onboard solar cell, it will communicate when its battery or capacitor becomes full. Thereafter, or once the power supply 47 falls below a set voltage, software running in memory 46 and on the microprocessor will cease transmissions. Thereafter the tag 41 will recharge, and can again communicate each time that it becomes full or when it reaches some other desired level of fullness such as a determined voltage level. Also, this communication can be modified by algorithms such as communicating when the energy storage is at some level of fullness and some other criteria is met such as not having communicated for some amount of time or when some amount of data has been accumulated or for other conditions. An example of this is communicating temperature as often as the tag 41 energy storage is sufficiently full to allow that data communication. Similarly, low-priority data can be communicated when the tag's energy storage becomes full. This allows communication as often as possible when the tag is being recharged.

Secure identification of individuals or objects can be significantly enhanced by the requirement for some other security-enhancing factor for the tags 41. For example, continuous measurement of a heartbeat of the attached animal, can make it more difficult to remove a tag 41 from an individual to place it on another individual as an alarm can be caused to sound by the software adapted to the task. Another method of increasing security is to have both an external tag 41 which can communicate easily, and an internal, or implanted, tag 41 or other device which is more difficult to remove which communicates with the external tag device. An external tag 41 which can communicate easily with RF, laser, or other directed-energy communications can communicate with an internal, injected, implanted, encapsulated, or hidden, or difficult-to-remove device which generates a cryptographic sequence or other more-secure signal which verifies that the external tag device is still attached to the correct individual or animal by communicating with that internal, injected, implanted, encapsulated, or hidden, or difficult-to-remove device. If such a tag is moved to another individual or object, it will lose its secure verification from communicating with the implanted or internal device, and will cease to operate. Since the internal device is designed to be very difficult to find and remove, this will add a level of security. This would be particularly useful in a battlefield area where identification friend-or-foe could be useful but where one does not want the enemy to simply have the ability to grab a tag off of a soldier and begin to use it. An opposing soldier would not have the battlefield time or ability to search for an injected tag to combine it with the external tag. This same security can be used to prevent intentional or unintentional misidentification of animals or objects. The external and internal tags 41 can be coded as an inseparable pair if so desired.

As also shown in FIG. 7, the configuration of a tag 41 of the system herein, can be activated by a wireless transmission such as from readers 48, which will activate a tag 41 and then receive transmissions from that tag 41, where the reader 48 can read transmitted metadata or ID codes of the requested tag 41, and/or other data requested by the reader 48. The tag 41 preferably can also communicate with other communication means 49, which can be different from readers 48, in that they either do not initiate tag actions or do not, themselves, receive the requested tag information.

Such other communication means 49, can include other tags or wireless transmission relay points. In one case, when such other communication means do not receive the tag information requested by a quire, they can be referred to as "triggers" or "Tag-Reading Wands," or by other terms which indicate that they are used to trigger or initiate tag actions such as transmitting ID codes or data but not necessarily to receive tag information. In one such use in the system a laser 14 triggered tag 41 can be activated with a trigger wand or tag reading wand 57 (FIG. 8) which is used to cause tags to transmit their ID codes, however, with the ID codes transmitted by the tag 41 queried, being received by other communication receiver means. An example of this use would be an animal handler triggering tags with a laser or tag reading wand 57 and the tag 41, when triggered, transmitting an ID code or data to a remotely located receiver and data handling system. This wand 57 can be very simple since it would not, in this example, need to have receiving and data handling means in the wand.

The Signal Receiving Means 40, may include optical signal receiving means, such as photo transistors or photo diodes; electromagnetic receiving means such as an inductive coil, or an antenna for a radio frequency signal; or audible or non-audible audio signal receiving means such as a microphone; or other signal receiving means. The signal receiving means 40 may be combined so that the signal receiving means 40 can receive wireless communications signals of more than one type of signal. In the preferred embodiment of the invention, optical detection means for receiving a laser trigger signal are combined with radio-frequency receiving means so that individual tags can be triggered and/or controlled by a laser signal or by radio-frequency signals.

In FIG. 8 is shown how tags 41 in the system can be configured to communicate through extended distances or around such obstacles that would otherwise block wireless signals, especially optically transmitted signals. Referring to FIG. 7, information or ID codes are desired from Tag A shown as 51, Tag B shown as 52, Tag C shown as 53, and Tag D shown as 54, or any combination of such tags and in any number thereof.

Shown in FIG. 8, a wireless transmission signal obstructing obstacle 55 is positioned where it blocks Tag A shown as 51, from receiving signals from the Reader 56 or from Tag-Reading Wand 57, or to and from a Receiver 58. When it is desired for the system to communicate with Tag A 51, but it is blocked by a signal obstruction 55, the employed reader 56 or tag reading wand, 57, or receiver 58, or other tag or tags, such as tag D shown as 54, can communicate with Tag A shown as 51, by a "daisy chain" relaying of signals through other tags, such as Tag C shown as 53, or a relay point 50, or by any combination of such networked or relayed communications. Such an indirect communication would be initiated should communication to Tag A shown as 51 not be answered by Tag A. When a non answer is determined, the system would send a new signal to tag A shown as 51, along with a handshake signal or metadata, which if received by any other tag or the relay point 50, will initiate a retransmission of the signal by that tag and/or the relay point 50. The response from Tag A when it receives the signal with the metadata indicating a circuitous route of communication, will generate a response which will include response metadata which will cause the other tags and the relay point 50, to ignore the response signal and simply retransmit it to other tags or the relay point 50. In this fashion, tags which do not respond to an initial signal from a reader 56, tag reading wand 57, or receiver 58 or transceiver, will cause the system to initiate the indirect route where tags become relays for transmissions as does the relay point 50.

For example a signal reader 56, can communicate with Tag C shown as 53 or a relay point 50 transceiver, which having a processor thereon to determine metadata in the signal to cause retransmission, will in turn communicate with Tag A shown as 51, for both transmitting and/or receiving information between the Tag C shown as 53 and the reader 56. Thus the system can initiate communication around a signal obstruction 55 when it is determined that a tag has not responded.

In a similar fashion, where maximum transmission distance 63 may be the communication issue rather than a signal obstruction 55, such as where tag B shown as 52 is beyond a maximum direct communications distance 63 of a reader 56, or receiver 57, or a tag reading wand 58. When such is detected by failure to receive a response from tag B shown as 52, communications with Tag B can be performed by relaying the communications with a handshake signal or metadata causing it to communicate by receipt and retransmission through other tags, such as Tag C shown as 53, which is closer to out-of-range Tag B, or through other signal repeating relays such as transceiver situated to receive and retransmit shown as relay 50. On large farms, feed lots, and the like, such relayed communications can be extended indefinitely by retransmission to a particular tag and back to the transmitting device, by going from tag to tag to tag, or tag to relay to tag, etc. It is to be appreciated that such relayed communication can be between tags, relay points, readers, receivers, and other communication nodes.

While all of the fundamental characteristics and features of the device and method have been shown and described herein, with reference to particular embodiments thereof, a latitude of modification, various changes, and substitutions are intended in the foregoing disclosure and it will be apparent that, in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications, variations, and substitutions are included within the scope of the invention as defined by the following claims.

What is claimed is:
1. An identification system comprising:
a handheld query component, said handheld query component including a projector of an outgoing coherent beam of light in a spectrum visually discernable by a human therefrom;
a plurality of tags, each said tag in said plurality adapted for engagement to an animal or object;
a light reflecting target surface positioned on each said tag;
said light reflecting target surface configured to project a light reflection along a return beam running toward said handheld query component, from said coherent beam of light in contact therewith;
viewing of said return beam from said light reflecting target surface of said tag, defining a visually discernable target contact on each said tag;
said visually discernable target contact providing a targeting for said handheld query component to thereby emit said coherent beam of light to a communication thereof with a single respective said light reflecting target surface on a targeted tag from said plurality of tags;
each said tag having a sensor producing a signal in response only to a said communication of said coherent beam of light therewith;
each said tag having a transmitter for communication of a wireless transmission in a response signal, only subsequent to a production of said signal by a respective said sensor, said response signal encoded with an identifier of said tag;
a receiver for said wireless transmission of said response signal;
whereby only said targeted tag chosen by said user through a targeting of said handheld query component to emit said coherent beam of light upon said light reflecting target surface of said targeted tag, emits a said response signal and, is identified individually, from a group of proximate said plurality of tags to thereby provide an identification of an associated animal or object to which said targeted tag is engaged;
said coherent beam being a laser beam;
said communication said laser beam with said light reflecting target surface of said targeted tag producing said return beam of light focused in a direction emanating toward said handheld query component;
said reflected return beam of light from said light reflecting target surface of said targeted tag, when viewed by said human aiming said handheld query component, providing said visually discernable target contact;
a sight engaged with said handheld query component;
said laser beam being in a spectrum in a frequency range of 350 nm to 750 nm;
said sight being telescopic;
whereby said human user aim said handheld query component using said sight to communicate said laser beam to said light reflecting target surface upon said tag located at a distance which is un-viewable by unaided eyesight, using said sight;
said coherent beam of light transmitting a query code during communication thereof with said surface of said targeted tag;

said targeted tag having said sensor producing said signal in response to said communication of said coherent beam of light;

said tag having a computing processor running software in electronic memory to the task of comparing said query code received in said signal from said sensor, to discern a match to a stored valid code held in said electronic memory;

said computing processor controlling said transmitter to generate said wireless transmission of said response signal only upon said software discerning a said match between said transmitted query code and said stored valid code; and whereby said identifier of said targeted tag is only provided by said targeted tag in response to said valid query code communicated from said handheld query component.

2. The identification system of claim 1 wherein said transmitter for communication of a wireless transmission in a response signal, comprises:

said targeted tag having a light emitting component engaged thereon; and said light emitting component communicating said response signal.

3. The identification system of claim 1 wherein said transmitter for communication of a wireless transmission in a response signal, comprises:

a light emitting component having a plurality of sides numbering between five and eight; and each of said plurality of sides having a light emitter thereon emitting said response signal in a direction away from said respective side upon which said light emitter is located.

4. The identification system of claim 1 wherein said response includes production of a sound by a transducer which induces an animal wearing said tag to move to a destination related by said animal to said sound.

5. The identification system of claim 1 wherein said response includes production of a sound by a transducer which induces an animal wearing said tag to change a direction of movement to a second direction of movement related by said animal to said sound.

6. The identification system of claim 1 wherein said tag has one or a plurality of secondary sensors located thereon from a group including a GPS sensor, a thermometer, and an accelerometer; and said wireless transmission in a said response signal includes data relating to one or a combination of terrestrial location discerned by a said GPS sensor, temperature discerned by said thermometer, and movement discerned by said accelerometer.

7. An identification system comprising:

a handheld query component, said query component including a projector of a coherent outgoing beam of light therefrom;

a targeting sight on said handheld component;

a plurality of tags, each said tag in said plurality adapted for engagement to an animal or object;

a reflecting target surface positioned on each said tag;

said reflecting target surface projecting a reflected beam of light in a light frequency range visible to humans, upon contact of said outgoing beam of light therewith;

said reflected beam of light viewed through said targeting sight, defining a visually discernable targeted contact on each said tag identifying a respective said tag contacted by said outgoing beam of light;

each said tag having a sensor, said sensor generating a sensor signal only upon a communication of said outgoing coherent beam of light therewith;

each said tag having a transmitter generating a wireless transmission of a response signal only upon receipt of said sensor signal from a respective said sensor, said response signal encoded with an identifier of said tag;

a receiver for said response signal;

whereby only a single targeted said tag chosen by a user through a targeting of said outgoing beam of light upon a respective reflecting target surface to generate a reflected beam of light therefrom, emits a said response signal with a respective said identifier of said tag, thereby individually identifying said targeted tag from a group of said tags proximate thereto;

said outgoing beam of light encoded with a query code;

said tag having a computing processor running software in electronic memory to the task of comparing said query code received from said sensor for a match to a stored code held in said electronic memory; and said transmitter generating said wireless transmission of a response only upon said software discerning a said match between said transmitted query code and said stored code.

8. The identification system of claim 7 additionally comprising:

said reflecting targeting surface is a retro-reflector; and said retro-reflector configured to project said reflected beam of light in a direction toward said targeting sight on said handheld query component.

* * * * *